United States Patent [19]

Binger et al.

[11] Patent Number: 4,796,486
[45] Date of Patent: Jan. 10, 1989

[54] GEAR MECHANISM FOR FULL-TRACK VEHICLE

[75] Inventors: Bernhard Binger, Ravensburg; Hans J. Eickhoff, Tettnang; Paul Maier, Friedrichshafen; Anton Engstler, Friedrichshafen; Herbert Grolig, Friedrichshafen, all of Fed. Rep. of Germany

[73] Assignee: Zahnradfabrik Friedrichshafen AG, Fed. Rep. of Germany

[21] Appl. No.: 887,803

[22] PCT Filed: Oct. 25, 1985

[86] PCT No.: PCT/EP85/00562
§ 371 Date: Jul. 11, 1986
§ 102(e) Date: Jul. 11, 1986

[87] PCT Pub. No.: WO86/02892
PCT Pub. Date: May 22, 1986

[30] Foreign Application Priority Data

Nov. 14, 1984 [EP] European Pat. Off. ............... PCT/EP84/00359

[51] Int. Cl.$^4$ ................................. F16H 57/02
[52] U.S. Cl. ............................. 74/606 R; 29/525.1; 180/6.7; 184/6.12
[58] Field of Search ............... 74/606 R, 606 A; 29/426, 526 R, 469; 403/388, 40, 35, 37, 34; 180/6.7, 6.2; 184/6.12

[56] References Cited

U.S. PATENT DOCUMENTS

| | | | |
|---|---|---|---|
| 1,909,626 | 5/1933 | Nilsson | 74/606 R |
| 2,305,012 | 12/1942 | Kinnucan | 74/606 X |
| 2,403,579 | 7/1946 | Carpenter | 184/6.12 |
| 2,548,805 | 4/1951 | Moir et al. | 74/606 A |
| 2,623,186 | 12/1952 | Wilde | 74/606 A X |
| 2,890,881 | 6/1959 | Tucker, Jr. | 74/606 X |
| 2,971,398 | 2/1961 | Sieving | 74/700 X |
| 2,971,403 | 2/1961 | Butterworth | 74/700 |
| 3,073,176 | 1/1963 | Daugirdas | 74/606 X |
| 3,246,538 | 4/1966 | Easton | 74/606 R |
| 3,354,534 | 11/1967 | Lewis | 74/606 R |
| 3,916,596 | 11/1975 | Hawley | 403/388 X |
| 4,100,821 | 7/1978 | Geiger | 74/606 R |
| 4,129,192 | 12/1978 | Todeschini et al. | 417/426 X |
| 4,252,031 | 2/1981 | Nishimura et al. | 74/606 R |
| 4,327,603 | 5/1982 | Zaunberger et al. | 74/720.5 X |
| 4,333,358 | 6/1982 | Grattapaglia | 74/606 R X |
| 4,449,422 | 5/1984 | Fuehrer et al. | 74/606 R |
| 4,506,772 | 3/1985 | Sommer | 192/18 A |
| 4,573,366 | 3/1986 | Kennard | 74/606 X |
| 4,640,152 | 2/1987 | Quick et al. | 74/606 R X |

FOREIGN PATENT DOCUMENTS

| | | | |
|---|---|---|---|
| 133722 | 6/1933 | Austria | 74/606 R |
| 573571 | 4/1959 | Canada | 74/606 R |
| 0115794 | 8/1984 | European Pat. Off. | |
| 2521331 | 11/1976 | Fed. Rep. of Germany | |
| 2920820 | 6/1981 | Fed. Rep. of Germany | |
| 3030850 | 6/1981 | Fed. Rep. of Germany | |
| 2351842 | 12/1977 | France | |
| 2400646 | 3/1979 | France | |
| 56-138562 | 10/1981 | Japan | 74/606 R |
| 9423 | of 1915 | United Kingdom | 184/6.12 |
| 648913 | 1/1951 | United Kingdom | |
| 1526542 | 9/1978 | United Kingdom | |

*Primary Examiner*—Richard E. Moore
*Assistant Examiner*—Rodney M. Lindsey
*Attorney, Agent, or Firm*—Davis, Bujold & Streck

[57] ABSTRACT

A gear mechanism for a full-track vehicle has a carrier-like housing (1) in which and on which are only fastened and positionally fixed in respect to each other prefabricated and examined subassemblies (2 to 11), while the functional—operative fluid and electric—connections between the subassemblies (2 to 11) result via flexible connections which compensate for deformations caused by heat and load and deviations caused by tolerance. The fastening of the subassemblies (3, 4, 5, 8) by bearing, centering and fastening elements (12) makes possible, if there is a good positional fixing, a great simplification. The functional connection of the subassemblies (2 to 11) also leads directly, together with the reduction of the coupling points, to a simplification of the gear housing (1) and to a reduction in the cost of machining and control.

10 Claims, 2 Drawing Sheets

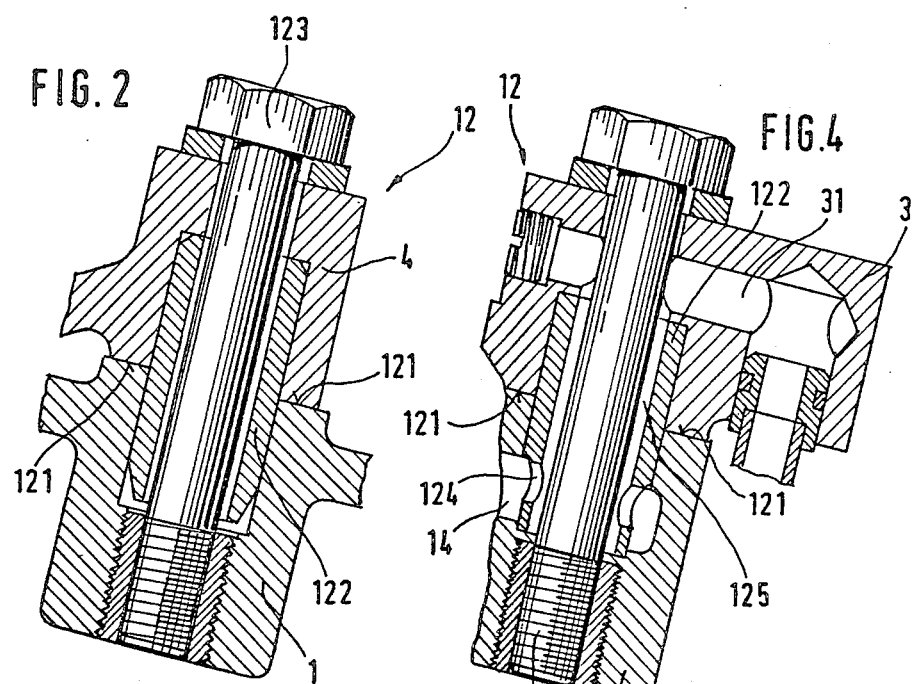

GEAR MECHANISM FOR FULL-TRACK VEHICLE

The invention concerns a gear mechanism for full-track vehicles according to the preamble of the main claim.

DE-OS 29 20 820 has disclosed such a gear mechanism wherein several sub-assemblies, partly prefabricated, are combined to form a gear mechanism mainly for the purpose of improving the manufacture and installation. Said modern construction has proved satisfactory and has led to considerable improvements in those relatively complicated gear mechanisms in which in addition to the transmission and adaptation of the drive engine to the chain drive there are also arranged a reversing and steering gear, the same as a converter, and often, as is to be seen in the above-cited publication, also a flow brake and an auxiliary power takeoff.

The housing of such a gear mechanism in which and on which the separate subassemblies must be installed is very complicated structural part due to the fastening of the subassemblies and their connections with the housing with regard to drive and fluid. It is necessary to manufacture a large number of mating surfaces, supports and connections coordinated with each other with a great precision so that all the solid connections for drive and fluid of the subassemblies with the housing ensure a perfect installation and the operation of the whole gear mechanism. This makes necessary a great expense in manufacture and control for the subassemblies and specially for the housing.

Therefore, the problem to be solved by the invention is further to develop a gear mechanism and to simplify it in relation to manufacture and installation expenses.

While according to the prior art in such a gear mechanism it is the housing part that is most complicated and causes the heaviest expenses in manufacture and control, according to the invention, the cast preparation and above all the final machining and the control expenses are considerably reduced, since the number of bores and mating surfaces is greatly diminished and the maintenance and controls of the necessary tolerances for a very great part of the processed surfaces cause less difficulties due to their small dimension. The elimination of all supports of the subassemblies in the housing for the operative connections and the flexible connections of the hydraulic, electric and operative coupling points between the subassemblies greatly simplify the production and installation.

The fixing of the subassemblies within the carrier-like housing by bearing, centering and fastening elements makes possible, togther with the reduction of the surfaces to be machined, large free spaces for the functionally best arrangement of said subassemblies. The bearing lugs, centering and fastening means arranged centrally with each other are in principle identically shaped and only the bearing lugs are adapted to the corresponding subassembly and to the gear housing. If the bearing lugs are situated in the gear housing staggered in peripheral direction for two subassemblies adjacently disposed in axial direction, there result favorable free spaces for the installation, and the arrangement of the bearing lugs can in principle result in the smallest diameter without there arising difficulties of installation.

If the bearing, centering and fastening elements are then also arranged staggered in axial direction, that is, the bearing lugs are not in an axial plane, there additionally result possibilities of improvement relative to the whole construction space so that the housing can be kept smaller and thus there results a reduction of the surfaces to be machined.

Since there are needed in the housing only apertures and passages for stub shafts by which the subassemblies disposed coaxially to each other are connected, the production cost is substantially less. The axially staggered arrangement of the subassemblies in respect to each other and their operative connection via toothed wheels, as result of the large free spaces in the housing, must be easily implemented doing justice to operation and manufacture, specially since the tooth meshing on the coupling points is defined simultaneously with the bearing, centering and fastening elements for the subassemblies.

A very simple installation of the individual subassemblies regarding the connection for the fluid is possible by the sockets, since due to the plug-like connections there results a simplification of the installation and there is also prevented a confusion of the connections, which can happen in flexible interconnecting pipes. At the same time a coupling point of the sockets is fastened with a holding means in each subassembly in a manner such that when disassembling the socket remains in this subassembly while it can be removed from the associated subassembly.

The construction of the gear housing with inclusion of the pressure tank, which is favorable and does justice to operation, makes possible short, plug-like connections. Specially favorable is the position of the gear control of the subassembly and the multiple couplings thereof via sockets with the variable gear of the subassembly, since thereby are eliminated many flexible connecting pipes and pipelines or oil conducting bores firmly mounted in the housing and thus the manufacture and installation are greatly simplified. Also no confusion of the formerly known flexible pipes can occur. The transmission of the fluid from the tank, for instance, to a subassembly is possible in a specially advantageous manner by additionally enlarging the bearing, centering and fastening element with a device for the transmission of fluid.

Other details of the invention are explained with reference to an embodiment and the drawings.

In the drawings:

FIG. 2 is a combned bearing, centering and fastening element.

FIG. 3 is a socket and the fastening thereof.

FIG. 4 is a combined bearing, centering and fastening element connected with the transmission of fluid from the tank to a subassembly.

FIG. 5 is an example for the transmission of fluid by sockets from the gear control of the subassembly to the variable gear of the subassembly.

Figure 1:
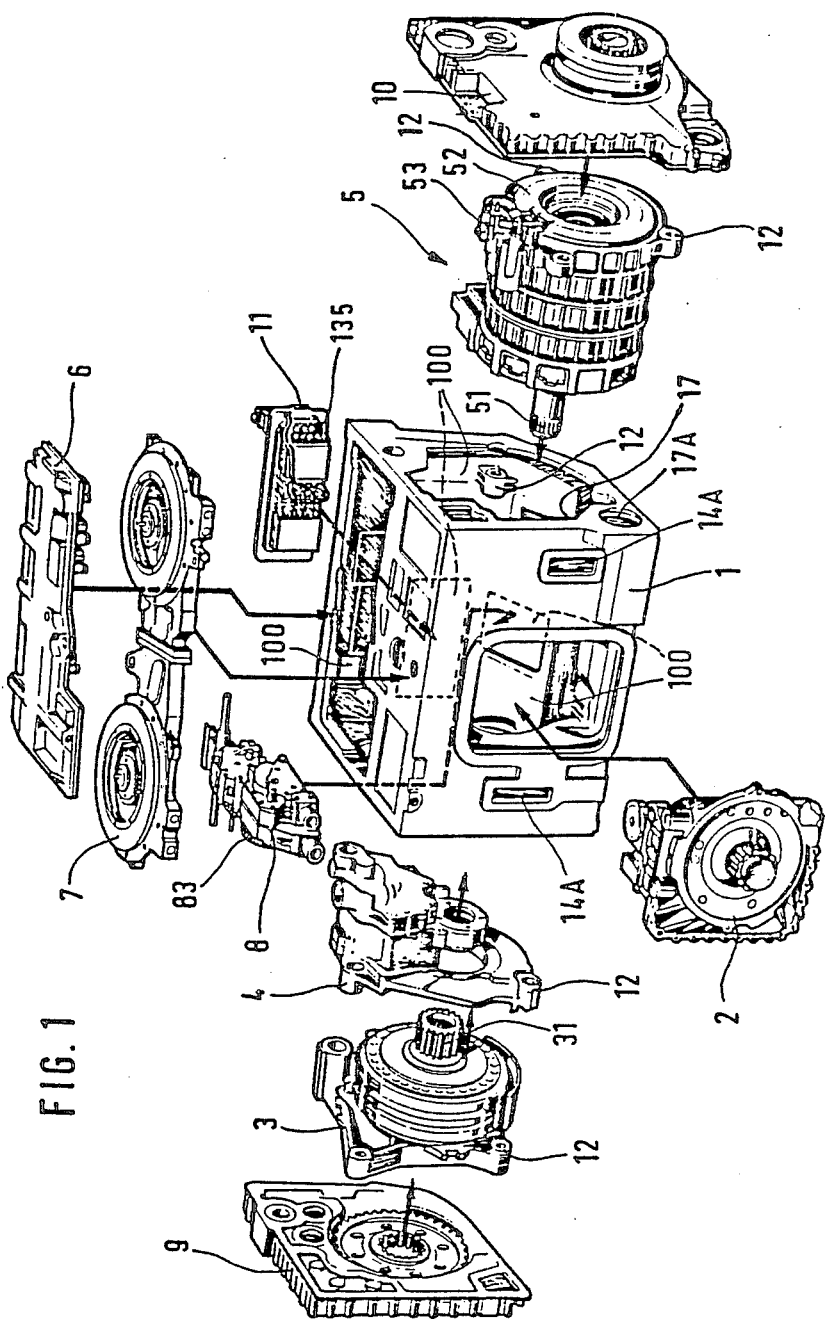
FIG. 1 is the carrier-like gear housing with the subassemblies situated in and on the gear housing.

FIG. 1 shows a carrier-like gear housing 1 with the apertures 100 for attachment and assembly of the drive 2 of the subassembly likewise shown and placed in the proximity of the corresponding attachment and assembly aperture, torque converter 3 with housing insert 4, variable gear with retarder and retarder control 5, steering gear with control 6, fan drive 7, side cover with summing gear 9, side cover with summing gear 10 and gear control 11. Behind the apertures 14A of the gear housing 1, which are to be closed by a cover, there is the pressure tank 14, which adapts to the shape of the gear housing and fills parts of the interior of the housing that are not needed by the subassemblies situated in the gear housing. Behind the aperture 17A is situated a filter 17.

The subassemblies situated within the gear housing 1, the same as the torque converter 3 with housing insert 4, the variable gear with retarder and retarder control 5 and the pumps 8, are in the first place firmly connected with the gear housing 1 via bearing, centering and fastening elements 12 (FIG. 2), which consist of the bearing lugs 121, the centering means, centering bush 122, and the fastening means, screws 123. There are provided in the first place for each subassembly three bearing, centering and fastening elements 12, which are situated in an axial plane but also axially staggered with one-half on the corresponding subassembly and the other half in the gear housing 1. The bearing, centering and fastening elements 12 of adjacent subassemblies can also be disposed staggered in peripheral direction, the coordination to each other of the subassemblies being exclusively determined by the function. Other subassemblies are connected via adequately shaped flanks with corresponding mating surfaces of the housing 1, thus, for instance, the subassembly drive 2, steering gear with control 6, fan drive 7, cover with the summing gear 9, side cover with the summing gear 10, and gear control 11. The subassemblies are interconnected when coaxially arranged via stub shafts such as 51 on the variable gear 5, which are exclusively supported in the subassembly and have no connection with the gear housing 1.

In case of axially staggered arrangement the operative connection results via the tooth meshing of adjacent subassemblies such as the toothed wheel 83, which are fixed to each other via the carrier-like gear housing 1.

The connections for fluid result in principle directly between the subassemblies, a few subassemblies such as the pumps 8 being connected also with the pressure tank 14 situated in the gear housing 1 and integrated therewith, since the tank ensures the whole supply of fluid for the gear mechanism. Between the subassemblies there are situated sockets 13 so that when the subassemblies are installed, the connections for fluid are simultaneously produced.

The fluid is directly transmitted from the gear control of the subassembly to the variable gear 5 of the subassembly with retarder 52 and retarder control 53 via several battery-like sockets 135 situated side by side, since several connections for fluid are required between said two subassemblies.

The combined bearing, centering and fastening element 12 according to FIG. 2 connects, for instance, the housing insert 4 of subassembly with the gear housing 1. Both parts to be connected have corresponding bearing lugs 121, centering means 122 and fastening means 123, the centering means being situated as centering bushing in corresponding centering bores of the parts to be connected. One of the parts to be connected has here a thread directly incorporated therein or carries a threaded bushing in which a setscrew, for instance, is tapped.

FIG. 3 shows a socket 13 for the connection for fluid of each two subassemblies, which is situated in a manner such that when installing the subassembly the couplings 132 of the socket, which are primarily provided with an O-ring, are fixed. For fastening the socket 13 in a subassembly, there is additionally arranged a holding means 133 to ensure that the sockets are held in one of the subassemblies when dismounting.

In the bearing, centering and fastening element 12 according to FIG. 4 there is also an annular space 125 for the transmission of fluid from the tank 14, for instance, which is in a cavity of the gear housing 1, to the housing insert 4 of the subassembly. The pressure tank 14 is at the same time connected with the housing insert 4 by a cross hole 124 in the centering bushing 122 and an annular space 125 with a fluid conduit 31.

FIG. 5 shows how in the cover 110 of the gear control 11 there are situated fluid conduits 111 over which the most different valves of the gear control are connected with the variable gear 5 of the subassembly via sockets 13. The retaining means 133 is here situated between the socket 13 and the gear control 11 in order that when the gear control is dismounted—removal of the control cover 110—the sockets remain in the gear control of the subassembly and that in case of necessary dismounting the removal of the variable gear 5 be possible through the narrow, front apertures of the gear housing 1 and a hindrance due to the sockets 13 does not result, and also above all that the sockets cannot fall in the interior of the gear housing 1. In a simpler and more convenient manner there are additionally passed on the fluid conduits 111 control bores 112, which control devices can be attached during examinations of operation.

We claim:

1. A transmission system for full track vehicle having a transmission housing, a variable gear subassembly (5) and a steering gear subassembly (6) disposed across a longitudinal axis and a plurality of additional subassemblies (2-4 and 7-11) being interconnected to one another only by internal connections (13, 31, 51), the improvement characterized in that at least one said subassembly is aligned and fastened to the transmission housing (1) by at least two fastening elements (12), each comprising a bearing lug (121), a centering means (122) and a fastening means (123), said bearing lug receiving said centering means and said fastening means and said fastening means (123) being surrounded by said centering means (122), each of said at least two fastening elements (12) being peripherally spaced adjacent the perimeter of said at least one subassembly (3, 4, 5, 8), being aligned substantially parallel to one another, and being staggered in an axial direction of the transmission housing with respect to one another, wherein said at least two fastening elements securely fasten said at least one subassembly to the transmission housing and thereby reduce surface area of the transmission housing to be machined.

2. A transmission system for full track vehicles according to claim 1, characterized in that three said fastening elements (12) are used for connection of each said at least one subassembly (3, 4, 5, 8).

3. A transmission system for full track vehicles according to claim 2, characterized in that said bearing lug (121), centering means (122) and fastening means (123) of each said fastening element (12) are disposed concentrically to one another.

4. A transmission system according to claim 1, characterized in that a co-axially operable interconnection is achieved between said at least one subassembly and an adjacent subassembly (3, 4, 5, 9, 10) via a stub shaft (31, 51).

5. A transmission system according to claim 2, characterized in that said axially staggered fastening elements help provide meshing of teeth of said plurality of subassemblies interconnected with said transmission housing (1).

6. A transmission system according to claim 1, characterized in that fluid connections between said at least one subassembly and any adjacent subassembly are achieved via sockets (13) provided with sealing means (131) which are supported by holding means (133) during disassembly.

7. A transmission system according to claim 1, characterized in that a pressure tank (14) for fluid is part of said transmission housing (1) and any necessary fluid connections for said at least one subassembly are achieved via sockets (13).

8. A transmission system according to claim 7, characterized in that fluid connections from said pressure tank (14) to said at least one subassembly are achieved via said fastening elements (12), and said fluid is transmitted via an annular space between the centering means (122) and the fastening means (123) of at least one said fastening element (12).

9. A transmission system according to claim 1, characterized in that fluid is supplied to at least one of said plurality of subassemblies (11) via fluid conduits (111) situated in a cover (110).

10. A transmission system according to claim 7, characterized in that a filter for said fluid is part of said transmission housing and is situated in said pressure tank (14).

* * * * *